US010117150B2

(12) United States Patent
Cui et al.

(10) Patent No.: US 10,117,150 B2
(45) Date of Patent: Oct. 30, 2018

(54) MOBILITY OPTIMIZATION METHOD, USER EQUIPMENT AND ACCESS NETWORK DEVICE

(71) Applicant: ZTE Corporation, Shenzhen, Guangdong (CN)

(72) Inventors: Yunpeng Cui, Shenzhen (CN); Qian Dai, Shenzhen (CN); Lei Mao, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 51 days.

(21) Appl. No.: 14/780,418

(22) PCT Filed: Mar. 19, 2014

(86) PCT No.: PCT/CN2014/073665
§ 371 (c)(1),
(2) Date: Nov. 3, 2015

(87) PCT Pub. No.: WO2014/154103
PCT Pub. Date: Oct. 2, 2014

(65) Prior Publication Data
US 2016/0050602 A1    Feb. 18, 2016

(30) Foreign Application Priority Data

Mar. 29, 2013 (CN) .......................... 2013 1 0109378

(51) Int. Cl.
*H04W 36/16* (2009.01)
*H04W 48/16* (2009.01)
*H04W 48/20* (2009.01)

(52) U.S. Cl.
CPC ......... *H04W 36/165* (2013.01); *H04W 48/16* (2013.01); *H04W 48/20* (2013.01)

(58) Field of Classification Search
CPC . H04W 48/20; H04W 48/18; H04W 36/0083; H04W 36/08; H04W 36/30
(Continued)

(56) References Cited

U.S. PATENT DOCUMENTS 8,285,290 B2    10/2012 Arora
2012/0294291 A1*  11/2012 Su ..................... H04W 72/1215
                                                    370/336

FOREIGN PATENT DOCUMENTS

CN    101742549 A    6/2010
CN    102202265 A    9/2011
(Continued)

OTHER PUBLICATIONS

International Search Report in international application No. PCT/CN2014/073665, dated Jun. 27, 2014.
(Continued)

*Primary Examiner* — Sam Bhattacharya
(74) *Attorney, Agent, or Firm* — Oppedahl Patent Law Firm LLC

(57) ABSTRACT

Disclosed in the present disclosure is a mobility optimization method. The method includes that a User Equipment (UE) having a small data feature performs, when determining that a cell supporting an optimized small data processing capability exists in candidate cells during execution of cell reselection, the cell reselection according to information of a small data priority cell reselection principle. Also disclosed is another mobility optimization method, including that a network side provides cell reselection information to a UE having a small data feature and normally residing in a cell; the cell reselection information includes information of a reselection principle including a small data processing capability factor and/or capability information indicating whether a network supports optimized small data processing or not; during execution of switching, a target Evolved Node
(Continued)

B (eNB) having an optimized small data processing capability and satisfying a switching condition is selected preferentially for the UE having the small data feature, and a switching request message is sent to the selected target eNB. Also disclosed are a UE and an access network device.

18 Claims, 9 Drawing Sheets

(58) Field of Classification Search
USPC .............. 455/436, 437, 447; 370/252, 331
See application file for complete search history.

(56) References Cited

FOREIGN PATENT DOCUMENTS

| | | |
|---|---|---|
| CN | 102340822 A | 2/2012 |
| CN | 102438294 A | 5/2012 |
| EP | 2720496 A1 | 4/2014 |
| JP | 2012503437 A | 2/2012 |
| WO | 2012160048 A1 | 11/2012 |

OTHER PUBLICATIONS

English Translation of the Written Opinion of the International Search Authority in international application No. PCT/CN2014/073665, dated Jun. 27, 2014.

China Mobile, Huawei, HiSilicon, Optimised LTE key hierarchy for small data transmission[online], 3GPP TSG-SA WG3#70 S3-130027, <URL:http://www.3gpp.org/ftp/tsg_sa/WG3_Security/TSGS3_70_Sophia/Docs/S3-130027.zip>, Jan. 21, 2013,mailed on Jan. 21, 2013.

SON and Femtocell Technology for LTE-Advanced System, mailed on Sep. 20-25, 2010.

Enhancing network connectivity using smart mobile sensors, mailed on Nov. 9-11, 2011.

3GPP-TR23.887, mailed on May 9-11, 2012.

* cited by examiner

MOBILITY OPTIMIZATION METHOD, USER EQUIPMENT AND ACCESS NETWORK DEVICE

TECHNICAL FIELD

The disclosure relates to a cell reselection and switching technology in the field of mobile communications, and particularly to a mobility optimization method, a User Equipment (UE) and an access network device.

BACKGROUND

Machine to Machine (M2M) communication, also known as Machine Type Communication (MTC) is a new communication concept in recent years, and MTC services have received much attention and have been widely applied, in intelligent homes, logistics monitoring and so on, for example. In the meanwhile, such intelligent terminals as smart phones and tablet computers emerging for personal needs also show a strong momentum with continuous improvement of people's living standards. More and more types of services, such as online games and streaming videos are running on intelligent terminals with the rapid development of wireless communications technology. In many application scenarios of MTC and intelligent terminals, a UE does not transmit a very large amount of data (generally dozens to several hundreds of bytes) and a data transmission can be completed by occupying only a few physical resources.

In existing Long Term Evolution (LTE) standard specifications, it is still necessary to establish a complete signaling process even if a very small amount of data is transmitted, thus resulting extremely high signaling cost during transmission of small data compared with the amount of transmitted data to largely reduce system efficiency. Therefore, it is imperative to research transmission characteristics of small data. Many solutions including data transmission using a signaling of a control plane and quick establishment of a user plane and so on have been suggested in the prior to solve the problem above. Due to different versions of a network and a UE or different strategies of operators, a network and a terminal are different in whether to support an optimized small data transmission method, which will lead to a failure in transmitting small data by the terminal and the network, and even cause an abnormal condition to increase the complexity in network processing. The original purpose to solve transmission of small data is to reduce signaling cost produced by transmission of small data. Thus, UEs having a small data feature/service in a network are centralized, if possible, in a network supporting such a function, which can better reduce signaling cost of the whole network caused by transmission of small data and help optimizing overall optimization of the network.

A cell having the highest frequency priority is selected as a reselected cell from cells satisfying a condition according to a cell reselection principle in a current protocol. If the cells satisfying the condition have the same frequency priority, the cells are ranked according to a reselection ranking method to select the most appropriate cell according to a ranking result. According to the cell reselection principle of the existing protocol, a UE having a small data transmission feature cannot be preferentially reselected to a network supporting an optimized small data transmission method, thus it is necessary to optimize the cell reselection principle in order to reduce the signaling cost of the whole network caused by transmission of small data. Similarly, a source network cannot preferentially select a UE having a small data transmission property to a network supporting an optimized small data transmission method when selecting a target network during UE switching in an existing protocol, thus it is also necessary to optimize a cell switching principle in order to reduce the signaling cost of the whole network caused by transmission of small data.

SUMMARY

Embodiments of the disclosure provide a mobility optimization method, a UE and an access network device in order to solve the existing technical problems.

An embodiment of the disclosure provides a mobility optimization method. The method includes that:

when determining that a cell supporting an optimized small data processing capability exists in candidate cells during execution of cell reselection, a UE having a small data feature performs the cell reselection according to information of a small data priority cell reselection principle.

In an embodiment, the UE having the small data feature includes one of the followings:

a UE configured to have a small data property;
a UE only supporting a small data service;
a UE going to receive or send small data; and
a UE in receiving or sending small data.

In an embodiment, the information of the small data priority cell reselection principle includes one of the followings or a combination of several of the followings:

when the UE having the small data feature normally resides in a current cell supporting the optimized small data processing capability, the current cell has the highest reselection priority;

in the case that a plurality of cells supporting the optimized small data processing capability satisfy a reselection condition, a cell having the highest reselection priority and/or the highest cell ranking is selected from the cells supporting the optimized small data processing capability;

the UE having the small data feature only selects a cell having the highest reselection priority or the highest cell ranking from cells supporting the optimized small data processing capability;

when the UE having the small data feature normally resides in a current cell supporting the optimized small data processing capability, reselection to a cell not supporting the optimized small data processing capability is delayed; and when the UE having the small data feature normally resides in a current cell not supporting the optimized small data processing capability, reselection to a cell supporting the optimized small data processing capability is accelerated.

In an embodiment, the operation that the reselection to the cell not supporting the optimized small data processing capability is delayed includes one of the following methods or a combination of several of the following methods:

in the case that, during a first preset continuous period of time, the sum of a cell selection receiving grade of a service cell and a small data processing capability factor is lower than a threshold of the cell selection receiving grade of the service cell, and a cell selection receiving grade of a cell having a low reselection priority is higher than a cell selection receiving grade threshold to reselect to a cell having a low priority, while the UE having the small data feature resides in a current cell for a duration exceeding a second preset period time, a cell not supporting optimized small data processing and having a low reselection priority is reselected to;

in the case that, during a first preset continuous period of time, the sum of the cell selection quality of a service cell and a small data processing capability factor is lower than a threshold of the cell selection quality of the service cell and the cell selection quality of a cell having a low reselection priority is higher than a cell selection quality threshold to reselect to a cell having a low priority while the UE having the small data feature resides in a current cell for a duration exceeding a second preset period of time, a cell not supporting optimized small data processing and having a low reselection priority is reselected to;

in the case that, during a first preset continuous period of time, a cell selection receiving grade of a cell having a high reselection priority is higher than a cell selection receiving grade threshold to reselect to a cell having a high priority, while the UE having the small data feature resides in a current cell for a duration exceeding a second preset period of time, a cell not supporting optimized small data processing and having a high reselection priority is reselected to;

in the case that, during a first preset continuous period of time, the cell selection quality of a cell having a high reselection priority is higher than a cell selection quality threshold to reselect to a cell having a high priority while the UE having the small data feature resides in a current cell for a duration exceeding a second preset period of time, a cell not supporting optimized small data processing and having a high reselection priority is reselected to;

in the case that, during a first preset continuous period of time, a cell ranking of a cell having a different central frequency from that of a service cell, but having the same reselection priority as that of the service cell, is higher than the sum of a ranking of the service cell and a small data processing capability factor while the UE having the small data feature resides in a current cell for a duration exceeding a second preset period of time, a cell having a different central frequency, but having the same reselection priority and not supporting the optimized small data processing capability is reselected to; and in the case that, during a first preset continuous period of time, a cell ranking of a cell having the same central frequency as that of a service cell is higher than the sum of a ranking of the service cell and a small data processing capability factor while the UE having the small data feature resides in a current cell for a duration exceeding a second preset period of time, a cell having the same central frequency, but not supporting the optimized small data processing capability is reselected to.

In an embodiment, the operation that the reselection to the cell supporting the optimized small data processing capability is accelerated includes one of the following methods or a combination of several of the following methods:

in the case that, during a first preset continuous period of time, a cell selection receiving grade of a service cell is lower than a threshold of the cell selection receiving grade of the service cell and the sum of a cell selection receiving grade of a cell having a low reselection priority and a small data processing capability factor is higher than a cell selection receiving grade threshold to reselect to a cell having a low priority while the UE having the small data feature resides in a current cell for a duration exceeding a second preset period of time, a cell supporting the optimized small data processing capability and having a low reselection priority is reselected to;

in the case that, during a first preset continuous period of time, the cell selection quality of a service cell is lower than a threshold of the cell selection quality of the service cell, and the sum of the cell selection quality of a cell having a low reselection priority and a small data processing capability factor is higher than a cell selection quality threshold to reselect to a cell having a low priority while the UE having the small data feature resides in a current cell for a duration exceeding a second preset period of time, a cell supporting the optimized small data processing capability and having a low reselection priority is reselected to;

in the case that, during a first preset continuous period of time, the sum of a cell selection receiving grade of a cell having a high reselection priority and a small data processing capability factor is higher than a cell selection receiving grade threshold to reselect to a cell having a high priority while the UE having the small data feature resides in a current cell for a duration exceeding a second preset period of time, a cell supporting the optimized small data processing capability and having a high reselection priority is reselected to;

in the case that, during a first preset continuous period of time, the sum of the cell selection quality of a cell having a high reselection priority and a small data processing capability factor is higher than a cell selection quality threshold to reselect to a cell having a high priority while the UE having a small data feature resides in a current cell for a duration exceeding a second preset period of time, a cell supporting the optimized small data processing capability and having a high reselection priority the UE is reselected to;

in the case that, during a first preset continuous period of time, the sum of a cell ranking of a cell having a different central frequency from that of a service cell but having the same reselection priority as that of the service cell and a small data processing capability factor is higher than a ranking of the service cell while the UE having the small data feature resides in a current cell for a duration exceeding a second preset period of time, a cell having a different central frequency but having the same reselection priority and supporting the optimized small data processing capability is reselected to;

in the case that, during a first preset continuous period of time, the sum of a cell ranking of a cell having the same central frequency as that of a service cell and a small data processing capability factor is higher than a ranking of the service cell while the UE having the small data feature resides in a current cell for a duration exceeding a second preset period of time, a cell having the same central frequency and supporting the optimized small data processing capability is reselected to.

In an embodiment, the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

An embodiment of the disclosure further provides a mobility optimization method. The method includes that:

a network device provides cell reselection information to a UE having a small data feature and normally residing in a cell, wherein the cell reselection information includes a small data processing capability factor and/or capability information indicating whether a network supports optimized small data processing or not; and during execution of switching, a target Evolved Node B (eNB) having an optimized small data processing capability and satisfying a switching condition is selected preferentially for the UE having the small data feature, and a switching request message is sent to the selected target eNB.

In an embodiment, the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

In an embodiment, the cell reselection information is transmitted to the UE through one of the following methods or a combination of several of the following methods:

a system message; and a downlink Radio Resource Control (RRC) signaling.

In an embodiment, the target eNB having the optimized small data processing capability is selected preferentially through one of the following methods:

when there are a plurality of eNBs satisfying the switching condition and supporting the optimized small data processing capability, an eNB with the best performance and/or the smallest load is selected preferentially as the target eNB; and when there are a plurality of eNBs satisfying the switching condition and only one eNB supports the optimized small data processing capability, the eNB supporting the optimized small data processing capability is selected preferentially as the target eNB.

In an embodiment, the UE having the small data feature includes at least one of the followings:

a UE configured to have a small data property;

a UE only supporting a small data service; and a UE in receiving or sending small data.

An embodiment of the disclosure further provides a UE. The UE has a small data feature and includes:

a determination module, configured to determine, during a process in which the UE executes cell reselection, whether a cell supporting an optimized small data processing capability exists in candidate cells;

a cell reselection module, configured to perform, when it is determined according to a determination of the determination module that the cell supporting the optimized small data processing capability exists in the candidate cells, the cell reselection according to information of a small data priority cell reselection principle.

In an embodiment, the UE having the small data feature includes at least one of the followings:

a UE configured to have a small data property;

a UE only supporting a small data service;

a UE going to receive or send small data; and a UE in receiving or sending small data.

In an embodiment, the information of the small data priority cell reselection principle includes one of the followings or a combination of several of the followings:

when the UE having the small data feature normally resides in a current cell supporting the optimized small data processing capability, the current cell has the highest reselection priority;

in the case that a plurality of cells supporting the optimized small data processing capability satisfy a reselection condition, a cell having the highest reselection priority and/or the highest cell ranking is selected from the cells supporting the optimized small data processing capability;

the UE having the small data feature only selects a cell having the highest reselection priority or the highest cell ranking from cells supporting the optimized small data processing capability;

when the UE having the small data feature normally resides in a current cell supporting the optimized small data processing capability, reselection to a cell not supporting the optimized small data processing capability is delayed; and when the UE having the small data feature normally resides in a current cell not supporting the optimized small data processing capability, reselection to a cell supporting the optimized small data processing capability is accelerated.

In an embodiment, the operation that the reselection to the cell not supporting the optimized small data processing capability is delayed includes one of the following methods or a combination of several of the following methods:

in the case that, during a first preset continuous period of time, the sum of a cell selection receiving grade of a service cell and a small data processing capability factor is lower than a threshold of the cell selection receiving grade of the service cell, and a cell selection receiving grade of a cell having a low reselection priority is higher than a cell selection receiving grade threshold to reselect to a cell having a low priority, while the UE having the small data feature resides in a current cell for a duration exceeding a second preset period time, a cell not supporting optimized small data processing and having a low reselection priority is reselected to;

in the case that, during a first preset continuous period of time, the sum of the cell selection quality of a service cell and a small data processing capability factor is lower than a threshold of the cell selection quality of the service cell and the cell selection quality of a cell having a low reselection priority is higher than a cell selection quality threshold to reselect to a cell having a low priority while the UE having the small data feature resides in a current cell for a duration exceeding a second preset period of time, a cell not supporting optimized small data processing and having a low reselection priority is reselected to;

in the case that, during a first preset continuous period of time, a cell selection receiving grade of a cell having a high reselection priority is higher than a cell selection receiving grade threshold to reselect to a cell having a high priority, while the UE having the small data feature resides in a current cell for a duration exceeding a second preset period of time, a cell not supporting optimized small data processing and having a high reselection priority is reselected to;

in the case that, during a first preset continuous period of time, the cell selection quality of a cell having a high reselection priority is higher than a cell selection quality threshold to reselect to a cell having a high priority while the UE having the small data feature resides in a current cell for a duration exceeding a second preset period of time, a cell not supporting optimized small data processing and having a high reselection priority is reselected to;

in the case that, during a first preset continuous period of time, a cell ranking of a cell having a different central frequency from that of a service cell, but having the same reselection priority as that of the service cell, is higher than the sum of a ranking of the service cell and a small data processing capability factor while the UE having the small data feature resides in a current cell for a duration exceeding a second preset period of time, a cell having a different central frequency, but having the same reselection priority and not supporting the optimized small data processing capability is reselected to; and in the case that, during a first preset continuous period of time, a cell ranking of a cell having the same central frequency as that of a service cell is higher than the sum of a ranking of the service cell and a small data processing capability factor while the UE having the small data feature resides in a current cell for a duration exceeding a second preset period of time, a cell having the same central frequency, but not supporting the optimized small data processing capability is reselected to.

In an embodiment, the operation that the reselection to the cell supporting the optimized small data processing capability is accelerated includes one of the following methods or a combination of several of the following methods:

in the case that, during a first preset continuous period of time, a cell selection receiving grade of a service cell is lower than a threshold of the cell selection receiving grade of the service cell and the sum of a cell selection receiving grade of a cell having a low reselection priority and a small data processing capability factor is higher than a cell selection receiving grade threshold to reselect to a cell having a low priority while the UE having the small data feature resides in a current cell for a duration exceeding a second preset period of time, a cell supporting the optimized small data processing capability and having a low reselection priority is reselected to;

in the case that, during a first preset continuous period of time, the cell selection quality of a service cell is lower than a threshold of the cell selection quality of the service cell, and the sum the cell selection quality of a cell having a low reselection priority and a small data processing capability factor is higher than a cell selection quality threshold to reselect to a cell having a low priority while the UE having the small data feature resides in a current cell for a duration exceeding a second preset period of time, a cell supporting the optimized small data processing capability and having a low reselection priority is reselected to;

in the case that, during a first preset continuous period of time, the sum of a cell selection receiving grade of a cell having a high reselection priority and a small data processing capability factor is higher than a cell selection receiving grade threshold to reselect to a cell having a high priority while the UE having the small data feature resides in a current cell for a duration exceeding a second preset period of time, a cell supporting the optimized small data processing capability and having a high reselection priority is reselected to;

in the case that, during a first preset continuous period of time, the sum of the cell selection quality of a cell having a high reselection priority and a small data processing capability factor is higher than a cell selection quality threshold to reselect to a cell having a high priority while the UE having a small data feature resides in a current cell for a duration exceeding a second preset period of time, a cell supporting the optimized small data processing capability and having a high reselection priority is selected to;

in the case that, during a first preset continuous period of time, the sum of a cell ranking of a cell having a different central frequency from that of a service cell but having the same reselection priority as that of the service cell and a small data processing capability factor is higher than a ranking of the service cell while the UE having the small data feature resides in a current cell for a duration exceeding a second preset period of time, a cell having a different central frequency but having the same reselection priority and supporting the optimized small data processing capability is reselected to; and in the case that, during a first preset continuous period of time, the sum of a cell ranking of a cell having the same central frequency as that of a service cell and a small data processing capability factor is higher than a ranking of the service cell while the UE having the small data feature resides in a current cell for a duration exceeding a second preset period of time, a cell having the same central frequency and supporting the optimized small data processing capability is reselected to.

In an embodiment, the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

An embodiment of the disclosure further provides an access network device, including:

an information providing module, configured to provide cell reselection information to a UE normally residing in a cell and having a small data feature, wherein the cell reselection information comprises information of a reselection principle including a small data processing capability factor and/or capability information indicating whether a network supports optimized small data processing or not; and a cell switching module configured to preferentially select, during execution of switching, a target eNB having an optimized small data processing capability and satisfying a switching condition for the UE having the small data feature and send a switching request message to the selected target eNB.

In an embodiment, the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

In an embodiment, the cell reselection information is transmitted to the UE through one of the following methods or a combination of several of the following methods:

a system message; and a downlink RRC signaling.

In an embodiment, the cell switching module is further configured to preferentially select the target eNB having the optimized small data processing capability through one of the following methods:

when there are a plurality of eNBs satisfying the switching condition and supporting the optimized small data processing capability, an eNB with the best performance and/or the smallest load is selected preferentially as the target eNB; and when there are a plurality of eNBs satisfying the switching condition and only one eNB supports the optimized small data processing capability, the eNB supporting the optimized small data processing capability is selected preferentially as the target eNB.

In an embodiment, the UE having the small data feature includes at least one of the followings:
 a UE configured to have a small data property;
 a UE only supporting a small data service; and
 a UE in receiving or sending small data.

According to a mobility optimization method, a UE and an access network device provided by the embodiments of the disclosure, a network supporting an optimized small data transmission can be preferentially reselected by a UE having a small data transmission feature during cell reselection, and the UE having the small data transmission feature can select the network supporting the optimized small data transmission during cell switching, thus reducing signaling overhead of the whole network caused by small data transmission, achieving performance optimization of the network and improving system efficiency.

DETAILED DESCRIPTION

Figure 1:
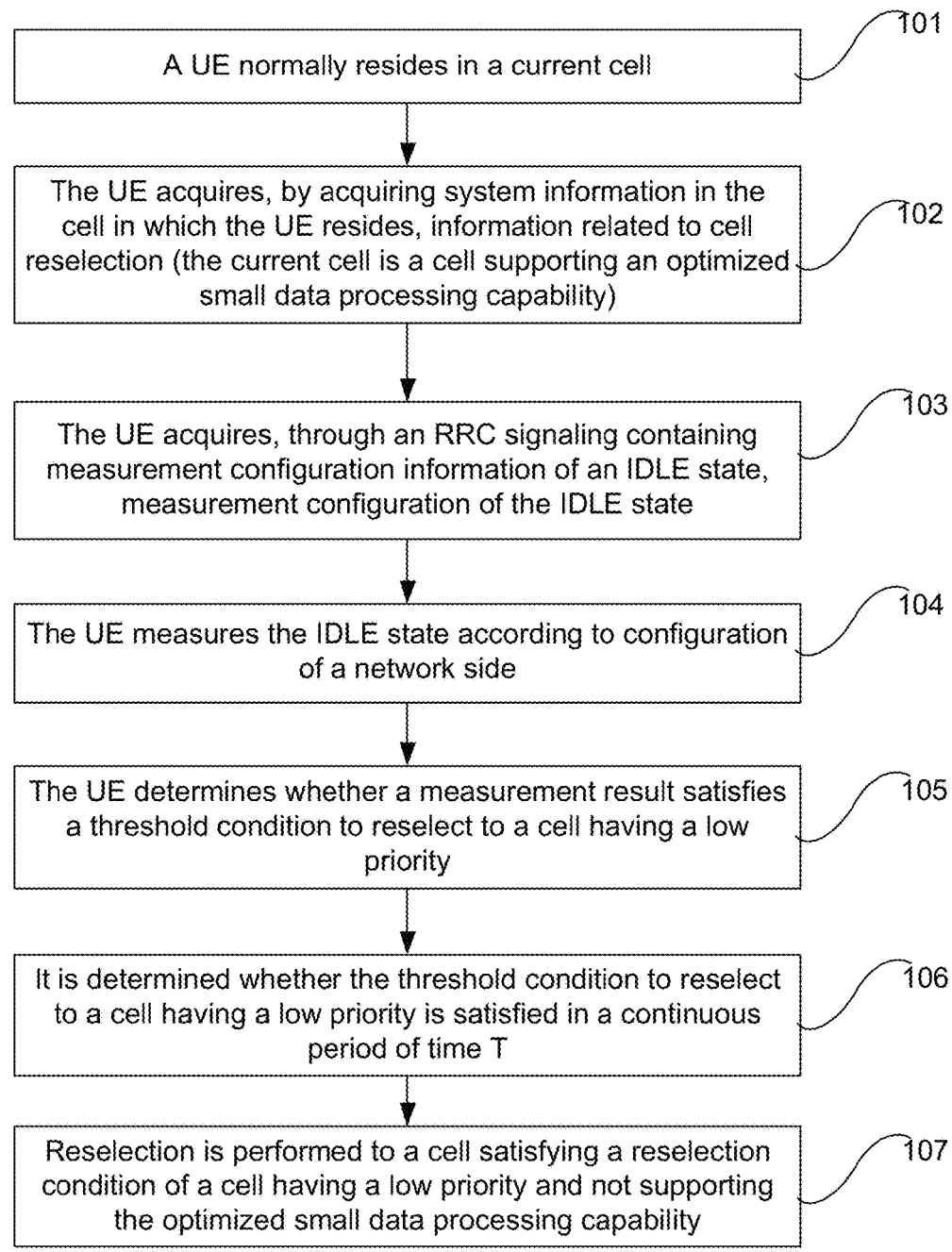
FIG. 1 is a flowchart of reselecting a UE from a cell where the UE resides and which supports an optimized small data processing capability to a cell having a low frequency priority and not supporting the optimized small data processing capability in an embodiment of the disclosure.

Technical solutions of the disclosure will be further expounded hereinafter with reference to the accompanying drawing and specific embodiments.

A mobility optimization method provided by an embodiment of the disclosure includes that when determining that a cell supporting an optimized small data processing capability exists in candidate cells during execution of cell reselection, a UE having a small data feature performs the cell reselection according to information of a small data priority cell reselection principle.

Herein the information of the small data priority cell reselection principle may be sent to the UE by a network side, and may be also preset in the UE.

Herein the UE having the small data feature includes one of the followings:
 a UE configured to have a small data property;
 a UE only supporting a small data service;
 a UE going to receive or send small data; and
 a UE in receiving or sending small data.

In an embodiment, the information of the small data priority cell reselection principle includes one of the followings or a combination of several of the followings:

when the UE having the small data feature normally resides in a current cell supporting the optimized small data processing capability, the current cell has the highest reselection priority;

in the case that a plurality of cells satisfy a reselection condition, and if the cells include a plurality of cells supporting the optimized small data processing capability, a cell having the highest reselection priority and/or the highest cell ranking is selected from the cells supporting the optimized small data processing capability;

the UE having the small data feature only selects a cell having the highest reselection priority or the highest cell ranking from cells supporting the optimized small data processing capability;

when the UE having the small data feature normally resides in a current cell supporting the optimized small data processing capability, reselection to a cell not supporting the optimized small data processing capability is delayed; and when the UE having the small data feature normally resides in a current cell not supporting the optimized small data processing capability, reselection to a cell supporting the optimized small data processing capability is accelerated.

In an embodiment, the operation that the reselection to the cell not supporting the optimized small data processing capability is delayed includes one of the following methods or a combination of several of the following methods:

in the case that, during a first preset continuous period of time, the sum of a cell selection receiving grade of a service cell and a small data processing capability factor (the factor corresponds to a small data processing capability factor of the service cell) is lower than a threshold of the cell selection receiving grade of the service cell, and a cell selection receiving grade of a cell having a low reselection priority is higher than a cell selection receiving grade threshold to reselect to a cell having a low priority, while the UE having the small data feature resides in a current cell for a duration exceeding a second preset period time, the UE reselects a cell not supporting optimized small data processing and having a low reselection priority;

in the case that, during a first preset continuous period of time, the sum of the cell selection quality of a service cell and a small data processing capability factor (the factor corresponds to a small data processing capability factor of the service cell) is lower than a threshold of the cell selection quality of the service cell and the cell selection quality of a cell having a low reselection priority is higher than a cell selection quality threshold to reselect to a cell having a low priority while the UE having the small data feature resides in a current cell for a duration exceeding a second preset period of time, the UE reselects a cell not supporting optimized small data processing and having a low reselection priority;

in the case that, during a first preset continuous period of time, a cell selection receiving grade of a cell having a high reselection priority is higher than a cell selection receiving grade threshold to reselect to a cell having a high priority, while the UE having the small data feature resides in a current cell for a duration exceeding a second preset period of time, the UE reselects a cell not supporting optimized small data processing and having a high reselection priority;

in the case that, during a first preset continuous period of time, the cell selection quality of a cell having a high reselection priority is higher than a cell selection quality threshold to reselect to a cell having a high priority while the UE having the small data feature resides in a current cell for a duration exceeding a second preset period of time, the UE reselects a cell not supporting optimized small data processing and having a high reselection priority;

in the case that, during a first preset continuous period of time, a cell ranking of a cell having a different central frequency from that of a service cell, but having the same reselection priority as that of the service cell, is higher than the sum of a ranking of the service cell and a small data processing capability factor (the factor corresponds to a small data processing capability factor of a different frequency and the same reselection priority) while the UE having the small data feature resides in a current cell for a duration exceeding a second preset period of time, the UE reselects a cell having a different central frequency, but having the same reselection priority and not supporting the optimized small data processing capability;

in the case that, during a first preset continuous period of time, a cell ranking of a cell having the same central frequency as that of a service cell is higher than the sum of a ranking of the service cell and a small data processing capability factor (the factor corresponds to a small data processing capability factor of the same frequency) while the UE having the small data feature resides in a current cell for a duration exceeding a second preset period of time, the UE reselects a cell having the same central frequency, but not supporting the optimized small data processing capability.

In an embodiment, the operation that the reselection to the cell supporting the optimized small data processing capability is accelerated includes one of the following methods or a combination of several of the following methods:

in the case that, during a first preset continuous period of time, a cell selection receiving grade of a service cell is lower than a threshold of the cell selection receiving grade of the service cell and the sum of a cell selection receiving grade of a cell having a low reselection priority and a small data processing capability factor (the factor corresponds to a small data processing capability factor of a low reselection priority) is higher than a cell selection receiving grade threshold to reselect to a cell having a low priority while the UE having the small data feature resides in a current cell for a duration exceeding a second preset period of time, the UE reselects a cell supporting the optimized small data processing capability and having a low reselection priority;

in the case that, during a first preset continuous period of time, the cell selection quality of a service cell is lower than a threshold of the cell selection quality of the service cell, and the sum the cell selection quality of a cell having a low reselection priority and a small data processing capability factor (the factor corresponds to a small data processing capability factor of a low reselection priority) is higher than a cell selection quality threshold to reselect to a cell having a low priority while the UE having the small data feature resides in a current cell for a duration exceeding a second preset period of time, the UE reselects a cell supporting the optimized small data processing capability and having a low reselection priority;

in the case that, during a first preset continuous period of time, the sum of a cell selection receiving grade of a cell having a high reselection priority and a small data processing capability factor (the factor corresponds to a small data processing capability factor of a high reselection priority) is higher than a cell selection receiving grade threshold to reselect to a cell having a high priority while the UE having the small data feature resides in a current cell for a duration exceeding a second preset period of time, the UE reselects a cell supporting the optimized small data processing capability and having a high reselection priority;

in the case that, during a first preset continuous period of time, the sum of the cell selection quality of a cell having a high reselection priority and a small data processing capability factor (the factor corresponds to a small data processing capability factor of a high reselection priority) is higher than a cell selection quality threshold to reselect to a cell having a high priority while the UE having a small data feature resides in a current cell for a duration exceeding a second preset period of time, the UE reselects a cell supporting the optimized small data processing capability and having a high reselection priority;

in the case that, during a first preset continuous period of time, the sum of a cell ranking of a cell having a different central frequency from that of a service cell but having the same reselection priority as that of the service cell and a small data processing capability factor (the factor corresponds to a small data processing capability factor of a different frequency and the same reselection priority) is higher than a ranking of the service cell while the UE having the small data feature resides in a current cell for a duration exceeding a second preset period of time, the UE reselects a cell having a different central frequency but having the same reselection priority and supporting the optimized small data processing capability;

in the case that, during a first preset continuous period of time, the sum of a cell ranking of a cell having the same central frequency as that of a service cell and a small data processing capability factor (the factor corresponds to a small data processing capability factor of the same frequency) is higher than a ranking of the service cell while the UE having the small data feature resides in a current cell for a duration exceeding a second preset period of time, the UE reselects a cell having the same central frequency and supporting the optimized small data processing capability.

In an embodiment, the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

Corresponding to the mobility optimization method, an embodiment of the disclosure further provides a UE. The UE has a small data feature and includes:

a determination module, configured to determine, during a process in which the UE executes cell reselection, whether a cell supporting an optimized small data processing capability exists in candidate cells;

a cell reselection module, configured to perform, when it is determined according to a determination of the determination module that the cell supporting the optimized small data processing capability exists in the candidate cells, the cell reselection according to information of a small data priority cell reselection principle, Herein, specific functions executed by the determination module and the cell reselection module in the UE are as described in the method above and will not be repeated here.

The mobility optimization method will be further expounded below with reference to specific embodiments.

FIG. 1 is a flow of reselecting a UE from a cell where the UE resides and which supports an optimized small data processing capability to a cell having a low frequency priority and not supporting the optimized small data processing capability, including the following steps:

Step 101: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE is configured to have a small data property and the current cell is cell A.

Step 102: The UE acquires, by acquiring system information in the cell in which the UE resides, information related to cell reselection.

An eNB may transmit parameters (i.e. the information related to the cell reselection) related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. The reselection priority of cell A is 4. However, since the cell supports the optimized small data processing capability, it is currently believed that the cell has the highest reselection priority which is 7. A cell selection quality threshold to reselect to a cell having a low priority is 4 dB, a threshold of the cell selection quality of a service cell is 3 dB, a small data processing capability factor of a low reselection priority is 1 dB which is the same as a small data processing capability factor of the service cell.

Step 103: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 104: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 2 dB, the cell selection quality of cell C is 5 dB, the cell selection quality of cell A is 1 dB, and the cell reselection priorities of cell B and cell C are 4 and 6 respectively which are lower than that of cell A.

Step 105: The UE determines whether a measurement result satisfies a threshold condition to reselect to a cell having a low priority.

In the present embodiment, since the cell reselection priorities of cell B and cell C are lower than that of cell A, the UE determines, according to an optimized cell reselection criterion, whether the measurement result satisfies a cell reselection condition.

Cell A satisfies that the sum of the cell selection quality (1 dB) and a small data processing capability factor (1 dB) of the service cell is lower than a cell selection quality threshold (3 dB) of the service cell.

Cell B satisfies that the sum of the cell selection quality (2 dB) and a small data processing capability factor (1 dB) of a low reselection priority is lower than a cell selection quality threshold (4 dB) to reselect to a cell having a low priority.

Cell C satisfies that the cell selection quality (5 dB) is higher than a cell selection quality threshold (4 dB) to reselect to a cell having a low priority.

Step 106: Whether the threshold condition to reselect to a cell having a low priority is satisfied in a continuous period of time T is determined.

In the present embodiment, the time T is 2 seconds. In a continuous period of 2 seconds, a reselection result acquired by cell C satisfies the threshold condition to reselect to a cell having a low priority.

Step 107: Reselection is performed to a cell satisfying a reselection condition of a cell having a low priority and not supporting the optimized small data processing capability.

The UE resides in cell A for 3 seconds, which exceeds a reselection threshold to reside in a service cell for at least 1 second. Therefore, the UE decides to reselect to cell C. After residing in cell C, the UE believes that cell C has the lowest priority which is 0 because cell C does not support the optimized small data processing capability.

Figure 2:
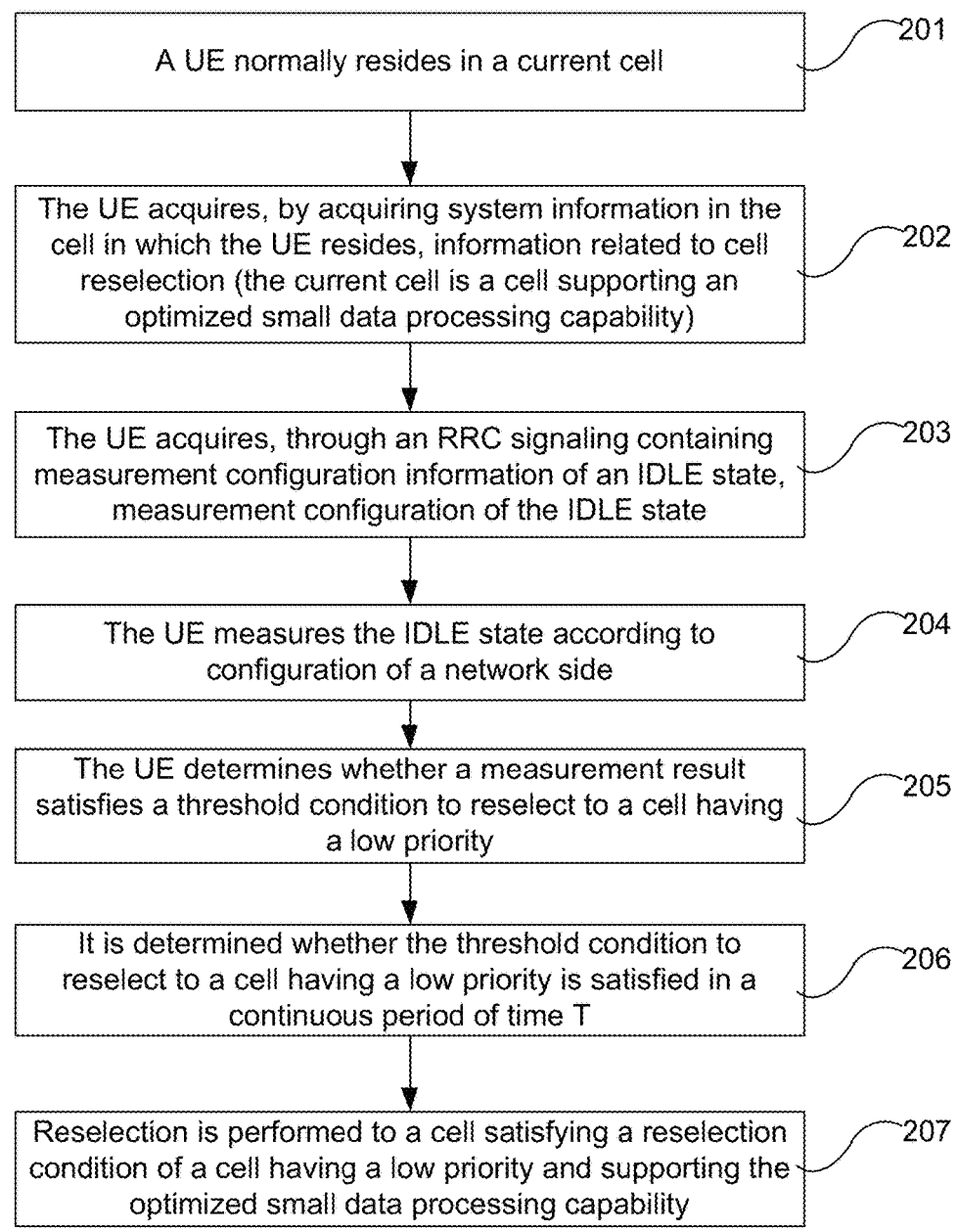
FIG. 2 is a flowchart of reselecting a UE from a cell where the UE resides and which supports an optimized small data processing capability to a cell having a low frequency priority and also supporting the optimized small data processing capability in an embodiment of the disclosure.

FIG. 2 is a flow of reselecting a UE from a cell where the UE resides and which supports an optimized small data processing capability to a cell having a low frequency priority and also supporting the optimized small data processing capability, including the following steps:

Step 201: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE is configured to have a small data property and the current cell is cell A.

Step 202: The UE acquires, by acquiring system information in the cell in which the UE resides, information related to cell reselection.

An eNB may transmit parameters related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. Since the cell supports the optimized small data processing capability, the cell has the highest reselection priority which is 7. A cell selection quality threshold to reselect to a cell having a low priority is 4 dB, a threshold of the cell selection quality of a service cell is 3 dB, a small data processing capability factor of a low reselection priority is 1 dB which is the same as a small data processing capability factor of the service cell.

Step 203: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 204: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B does not support the optimized small data processing capability while cell C supports the optimized small data processing capability. At the moment, the cell selection quality of cell B is 4 dB, the cell selection quality of cell C is 4 dB, the cell selection quality of cell A is 1 dB, and the cell reselection priorities of cell B and cell C are 4 and 6 respectively which are lower than that of cell A.

Step 205: The UE determines whether a measurement result satisfies a threshold condition to reselect to a cell having a low priority.

In the present embodiment, since the cell reselection priorities of cell B and cell C are lower than that of cell A, the UE determines, according to an optimized cell reselection criterion, whether the measurement result satisfies the threshold condition to reselect to a cell having a low priority.

Cell A satisfies that the sum of the cell selection quality (1 dB) and a small data processing capability factor (1 dB) of the service cell is lower than a cell selection quality threshold (3 dB) of the service cell.

Cell B satisfies that the sum of the cell selection quality (4 dB) and a small data processing capability factor (1 dB) of a low reselection priority is higher than a cell selection quality threshold (4 dB) to reselect to a cell having a low priority;

Cell C satisfies that the cell selection quality (4 dB) is equal to a cell selection quality threshold (4 dB) to reselect to a cell having a low priority.

Step 206: Whether the threshold condition to reselect to a cell having a low priority is satisfied in a continuous period of time T is determined.

In the present embodiment, the time T is 2 seconds. In a continuous period of 2 seconds, a reselection result acquired by cell B satisfies an optimized cell reselection solution to reselect to a cell having a low priority.

Step 207: Reselection is performed to a cell satisfying a reselection condition of a cell having a low priority and supporting the optimized small data processing capability.

The UE resides in cell A for 4 seconds, which exceeds a reselection threshold to reside in a service cell for at least 1 second. Therefore, the UE decides to reselect to cell B. After residing in cell B, the UE believes that cell B has the highest priority which is 7 because cell B supports the optimized small data processing capability.

Figure 3:
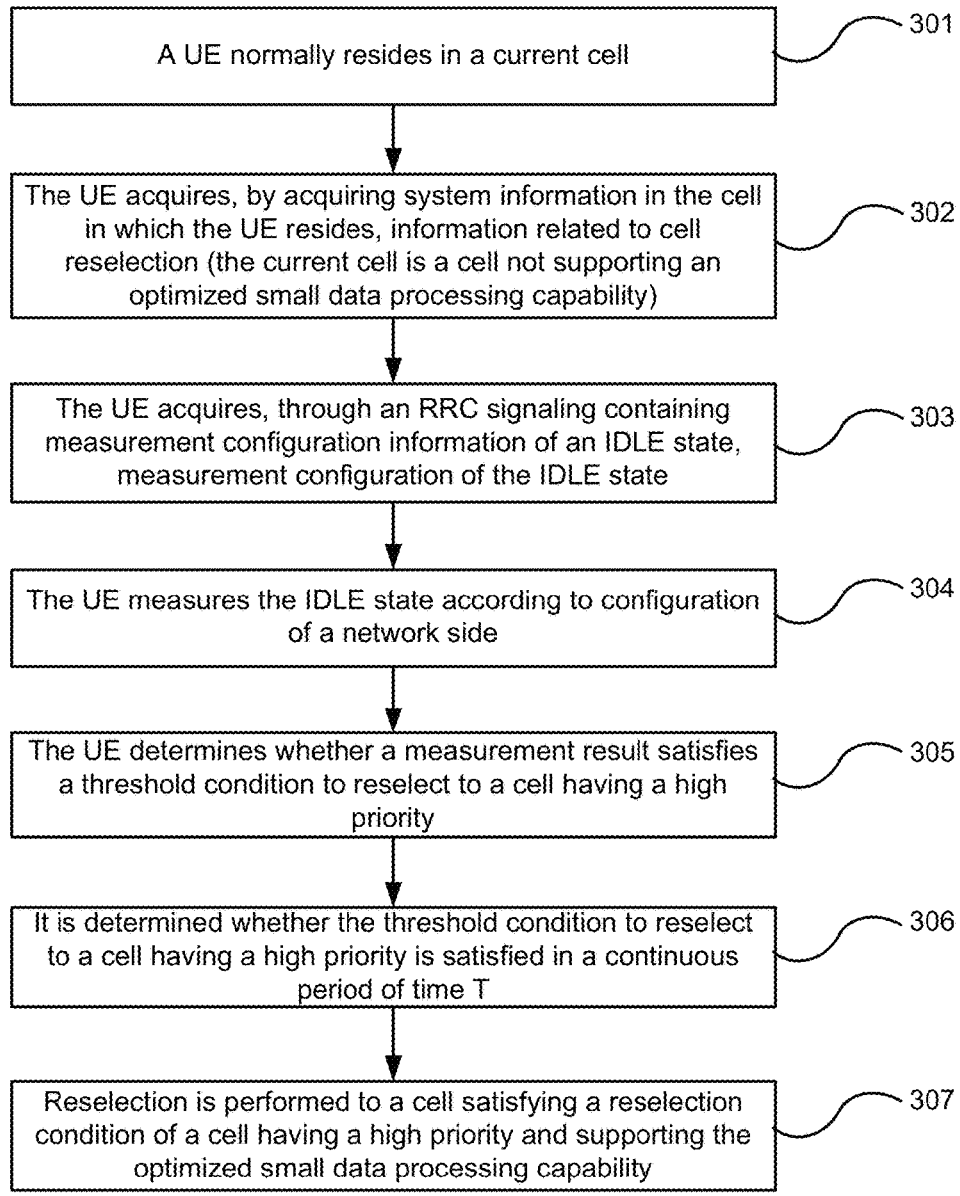
FIG. 3 is a flowchart of reselecting a UE from a cell where the UE resides and which does not support an optimized small data processing capability to a cell having a high frequency priority and supporting the optimized small data processing capability in an embodiment of the disclosure.

FIG. 3 is a flow of reselecting a UE from a cell where the UE resides and which does not support an optimized small data processing capability to a cell having a high frequency priority and supporting the optimized small data processing capability, including the following steps:

Step 301: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE only supports a small data service and the current cell is cell A.

Step 302: The UE acquires, by acquiring system information in the cell in which the UE resides, information related to cell reselection.

An eNB may transmit parameters related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. The reselection priority of the cell is 3. Since the cell does not support the optimized small data processing capability, it is believed that the cell has the lowest reselection priority which is 0. A cell selection quality threshold to reselect to a cell having a high priority is 3 dB, a threshold of the cell selection quality of a service cell is 3 dB, a small data processing capability factor of a high reselection priority is 2 dB (a value of the factor may be 0 dB to 31 dB) which is the same as a small data processing capability factor of the service cell.

Step 303: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 304: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 3 dB, the cell selection quality of cell C is 2 dB, the cell selection quality of cell A is 2 dB, and the cell reselection priorities of cell B and cell C are 4 and 6 respectively which are higher than that of cell A.

Step 305: The UE determines whether a measurement result satisfies a threshold condition to reselect to a cell having a high priority.

In the present embodiment, since the cell reselection priorities of cell B and cell C are higher than that of cell A, the UE determines, according to an optimized cell reselection criterion, whether the measurement result satisfies the threshold condition to reselect to a cell having a high priority.

Cell B satisfies that the sum of the cell selection quality (3 dB) and a small data processing capability factor (2 dB) of a high reselection priority is higher than a cell selection quality threshold (3 dB) to reselect to a cell having a high priority;

Cell C satisfies that the cell selection quality (2 dB) is lower than a cell selection quality threshold (3 dB) to reselect to a cell having a high priority.

Step 306: Whether the threshold condition to reselect to a cell having a high priority is satisfied in a continuous period of time T is determined.

In the present embodiment, the time T is 2 seconds. In a continuous period of 2 seconds, a reselection result acquired by cell B satisfies an optimized cell reselection solution to reselect to a cell having a high priority.

Step 307: Reselection is performed to a cell satisfying a reselection condition of a cell having a high priority and supporting the optimized small data processing capability.

The UE resides in cell A for 2 seconds, which exceeds a reselection threshold to reside in a service cell for at least 1 second. Therefore, the UE decides to reselect to cell B. After residing in cell B, the UE believes that cell B has the highest priority which is 7 because cell B supports the optimized small data processing capability.

Figure 4:
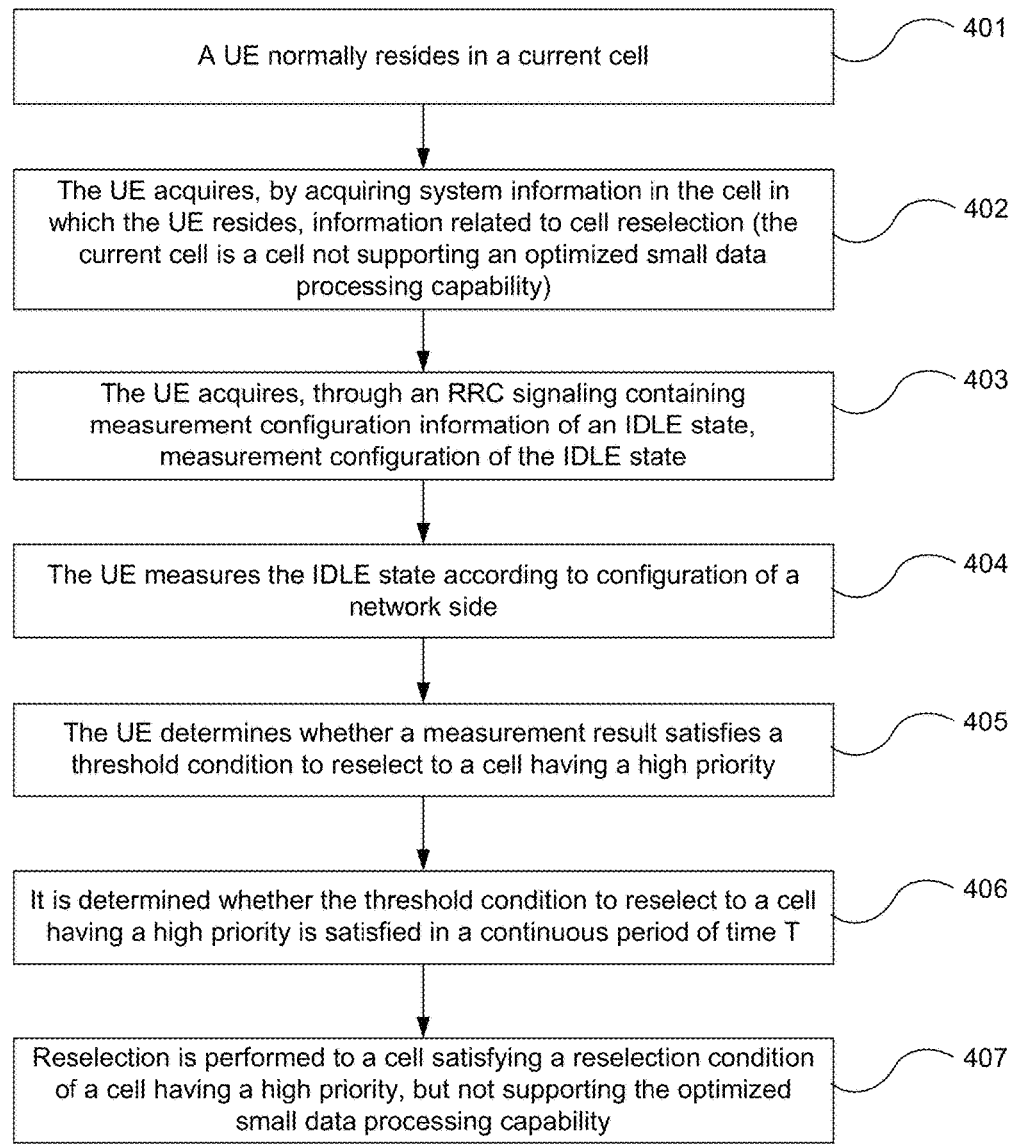
FIG. 4 is a flowchart of reselecting a UE from a cell where the UE resides and which does not support an optimized small data processing capability to a cell having a high frequency priority and also not supporting the optimized small data processing capability in an embodiment of the disclosure.

FIG. 4 is a flow of reselecting a UE from a cell where the UE resides and which does not support an optimized small data processing capability to a cell having a high frequency priority and also not supporting the optimized small data processing capability, including the following steps:

Step 401: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE only supports a small data service and the current cell is cell A.

Step 402: The UE acquires, by acquiring system information in the cell in which the UE resides, information related to cell reselection.

An eNB may transmit parameters related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. The reselection priority of the cell is 3. Since the cell does not support the optimized small data processing capability, it is believed that the cell has the lowest reselection priority which is 0. A cell selection quality threshold to reselect to a cell having a high priority is 3 dB, a threshold of the cell selection quality of a service cell is 3 dB, a small data processing capability factor of a high reselection priority is 1 dB (a value of the factor may be 0 dB to 31 dB) which is the same as a small data processing capability factor of the service cell.

Step 403: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 404: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 1 dB, the cell selection quality of cell C is 4 dB, the cell selection quality of cell A is 2 dB, and the cell reselection priorities of cell B and cell C are 4 and 6 respectively which are higher than that of cell A.

Step 405: The UE determines whether a measurement result satisfies a threshold condition to reselect to a cell having a high priority.

In the present embodiment, since the cell reselection priorities of cell B and cell C are higher than that of cell A, the UE determines, according to an optimized cell reselection criterion, whether the measurement result satisfies the threshold condition to reselect to a cell having a high priority.

Cell B satisfies that the sum of the cell selection quality (1 dB) and a small data processing capability factor (1 dB) of a high reselection priority is lower than a cell selection quality threshold (3 dB) to reselect to a cell having a high priority;

Cell C satisfies that the cell selection quality (4 dB) is higher than a cell selection quality threshold (3 dB) to reselect to a cell having a high priority.

Step 406: Whether the threshold condition to reselect to a cell having a high priority is satisfied in a continuous period of time T is determined.

In the present embodiment, the time T is 2 seconds. In a continuous period of 2 seconds, a reselection result acquired by cell C satisfies an optimized cell reselection solution to reselect to a cell having a high priority. Therefore UE decides to reselect to cell C.

Step 407: Reselection is performed to a cell satisfying a reselection condition of a cell having a high priority and supporting the optimized small data processing capability.

The UE resides in cell A for 2 seconds, which exceeds a reselection threshold to reside in a service cell for at least 1 second. Therefore, the UE decides to reselect to cell C. After residing in cell C, the UE believes that cell C has the lowest priority which is 0 because cell C does not support the optimized small data processing capability.

Figure 5:
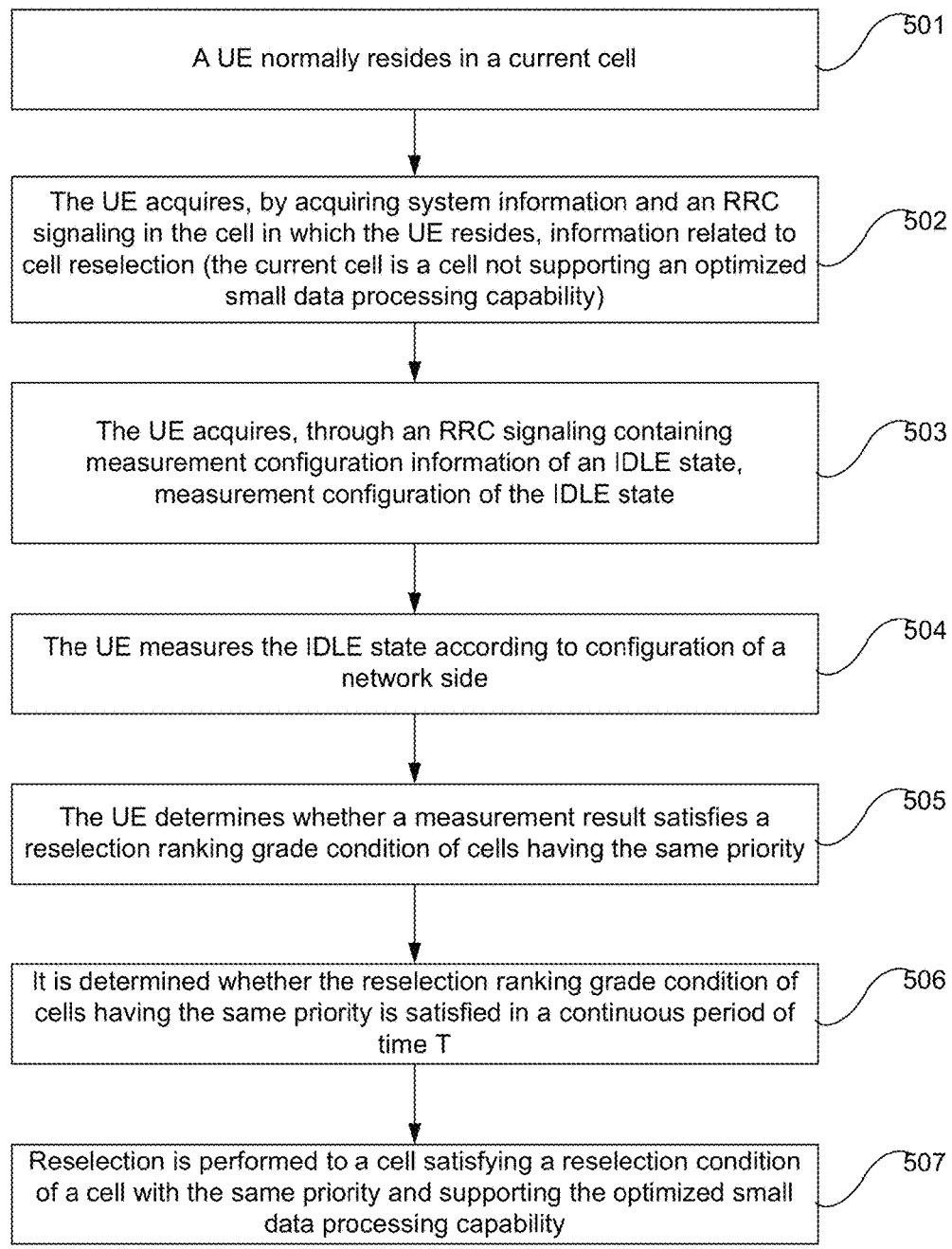
FIG. 5 is a flowchart of reselecting a UE from a cell where the UE resides and which does not support an optimized small data processing capability to a cell having a different central frequency and the same reselection priority and supporting the optimized small data processing capability in an embodiment of the disclosure.

FIG. 5 is a flow of reselecting a UE from a cell where the UE resides and which does not support an optimized small data processing capability to a cell having a different central frequency and the same reselection priority and supporting the optimized small data processing capability, including the following steps:

Step 501: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE only supports a small data service and the current cell is cell A.

Step 502: The UE acquires, by acquiring system information an RRC message in the cell in which the UE resides, information related to cell reselection.

An eNB may transmit parameters related to a cell reselection process to the UE by using a system message and/or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process through the system message, and transmits supporting information of the optimized small data processing capability of a cell through the RRC signaling to the UE so that the parameters and the supporting information are used in the subsequent cell reselection process. The related parameters in the cell reselection process include: a cell reselection priority, a cell delay value and a threshold of a co-frequency cell selection receiving grade and so on. The reselection priority of the cell is 3. Since the cell does not support the optimized small data processing capability, it is believed that the cell has the lowest reselection priority which is 0. A delay value of the cell is 1 dB, a small data processing capability factor of a different frequency and the same reselection priority is 1 dB (a value of the factor may be 0 dB to 31 dB) and an inter-cell offset is 0 dB.

Step 503: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 504: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 3 dB, the cell selection quality of cell C is 3 dB, the cell selection quality of cell A is 2 dB, and the cell reselection priorities of cell B and cell C are 0 respectively which are the same as that of cell A.

Step 505: The UE determines whether a measurement result satisfies a cell ranking grade condition of a cell having the same priority.

In the present embodiment, since the cell reselection priorities of cell B and cell C are the same as that of cell A, the UE determines, according to an optimized cell reselection criterion, whether the measurement result satisfies the cell ranking grade condition of a cell having the same priority.

Cell A satisfies that a grade of a service cell is 2 dB which is equal to the sum of the cell selection quality (1 dB) and the cell delay value (1 dB).

Cell B satisfies that a level of an adjacent cell is 4 dB which is equal to the sum of the cell selection quality (3 dB) and a small data processing capability factor (1 dB) of a different frequency and the same reselection priority.

Cell C satisfies that a grade of an adjacent cell is equal to the cell selection quality (3 dB).

The grade of the adjacent cell of cell B>the grade of the adjacent cell of cell C>the grade of the adjacent cell of cell A.

Step 506: Whether the cell ranking grade condition of a cell having the same priority is satisfied in a continuous period of time T is determined.

In the present embodiment, the time T is 2 seconds. In a continuous period of 2 seconds, a cell ranking grade obtained by cell B is higher than those of cell C and cell A.

Step 507: Reselection is performed to a cell satisfying a reselection condition of a cell of the same priority and supporting the optimized small data processing capability.

The UE resides in cell A for 2 seconds, which exceeds a reselection threshold to reside in a service cell for at least 1 second. Therefore, the UE decides to reselect to cell B. After residing in cell B, the UE believes that cell B has the highest priority which is 7 because cell B supports the optimized small data processing capability.

Figure 6:
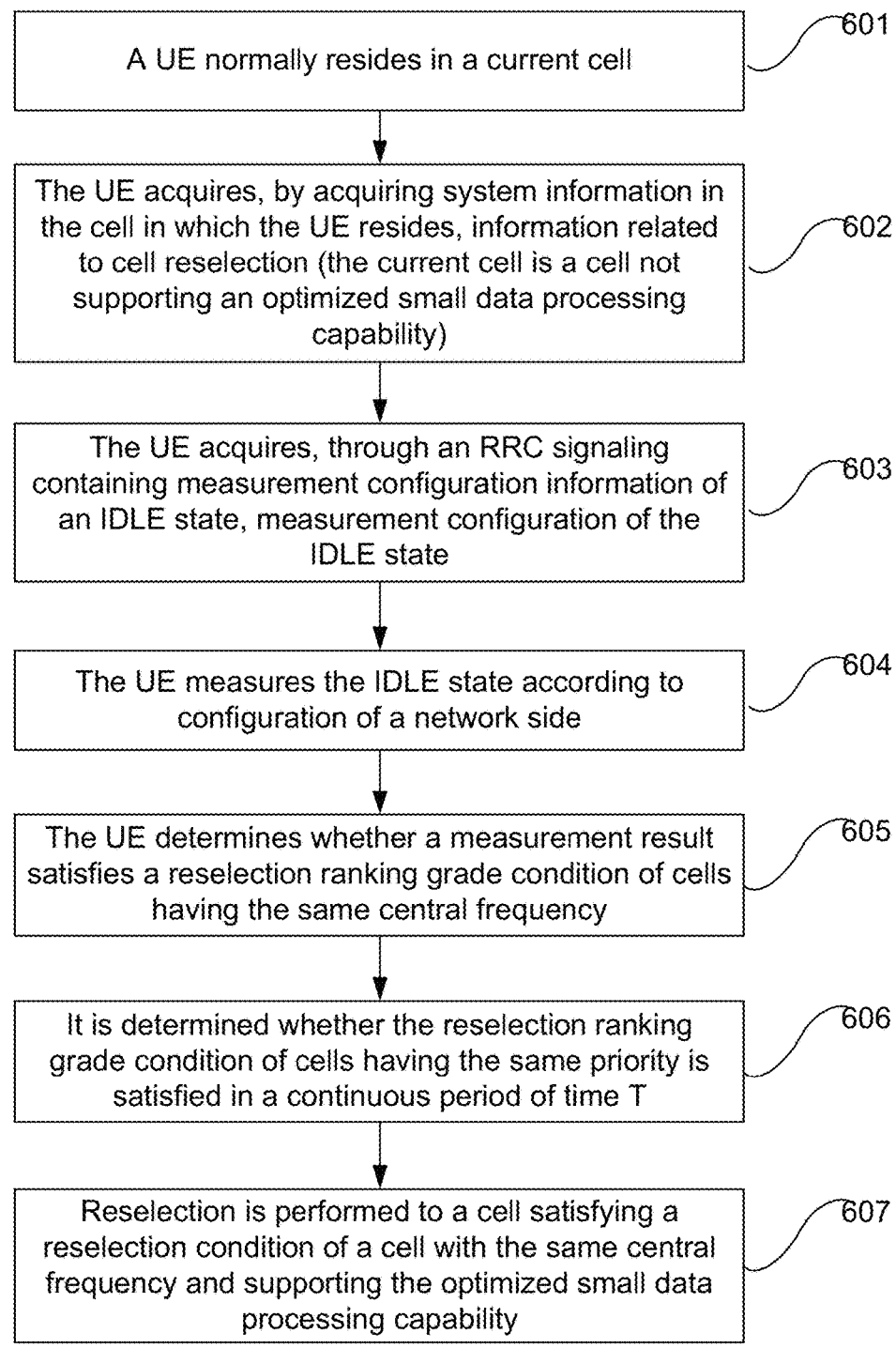
FIG. 6 is a flowchart of reselecting a UE from a cell where the UE resides and which does not support an optimized small data processing capability to a cell having the same central frequency and supporting the optimized small data processing capability in an embodiment of the disclosure.

FIG. 6 is a flow of reselecting a UE from a cell where the UE resides and which does not support an optimized small data processing capability to a cell having the same central frequency and supporting the optimized small data processing capability, including the following steps:

Step 601: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE is going to send small data and the current cell is cell A.

Step 602: The UE acquires, by acquiring system information in the cell in which the UE resides, information related to cell reselection.

An eNB may transmit parameters related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. The reselection priority of the cell is 3. Since the cell does not support the optimized small data processing capability, it is believed that the cell has the lowest reselection priority which is 0. A delay value of the cell is 1 dB, a small data processing capability factor of the same frequency is 1 dB (a value of the factor may be 0 dB to 31 dB) and an inter-cell offset is 0 dB.

Step 603: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells have the same central frequency at that of cell A.

Step 604: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 4 dB, the cell selection quality of cell C is 4 dB, the cell selection quality of cell A is 2 dB, and the cell reselection priorities of cell B and cell C are 3 and 4 respectively.

Step 605: The UE determines whether a measurement result satisfies a cell ranking grade condition of a cell having the same central frequency.

The UE determines, according to an optimized cell reselection criterion, whether the measurement result satisfies a cell reselection condition.

In the present embodiment, since cell B and cell C have the same central frequency as that of cell A, a cell reselection solution of a cell of the same frequency is used.

Cell A satisfies that a grade of a service cell is 3 dB which is equal to the sum of the cell selection quality (2 dB) and the cell delay value (1 dB).

Cell B satisfies that a level of an adjacent cell is 5 dB which is equal to the sum of the cell selection quality (4 dB) and a small data processing capability factor (1 dB) of the same frequency.

Cell C satisfies that a grade of an adjacent cell is equal to the cell selection quality (4 dB).

The grade of the adjacent cell of cell B>the grade of the adjacent cell of cell C>the grade of the adjacent cell of cell A.

Results acquired by the UE in a continuous period of time T are the same as the results above and T is 600 milliseconds in the present embodiment.

Step 606: Whether the cell ranking grade condition of a cell having the same priority is satisfied in a continuous period of time T is determined.

In the present embodiment, the time T is 2 seconds. In a continuous period of 2 seconds, a cell ranking grade obtained by cell B is higher than those of cell C and cell A.

Step 607: Reselection is performed to a cell satisfying a reselection condition of a cell of the same central frequency and supporting the optimized small data processing capability.

The UE resides in cell A for 2 seconds, which exceeds a reselection threshold to reside in a service cell for at least 1 second. Therefore, the UE decides to reselect to cell B. After residing in cell B, the UE believes that cell B has the highest priority which is 7 because cell B supports the optimized small data processing capability.

Figure 7:
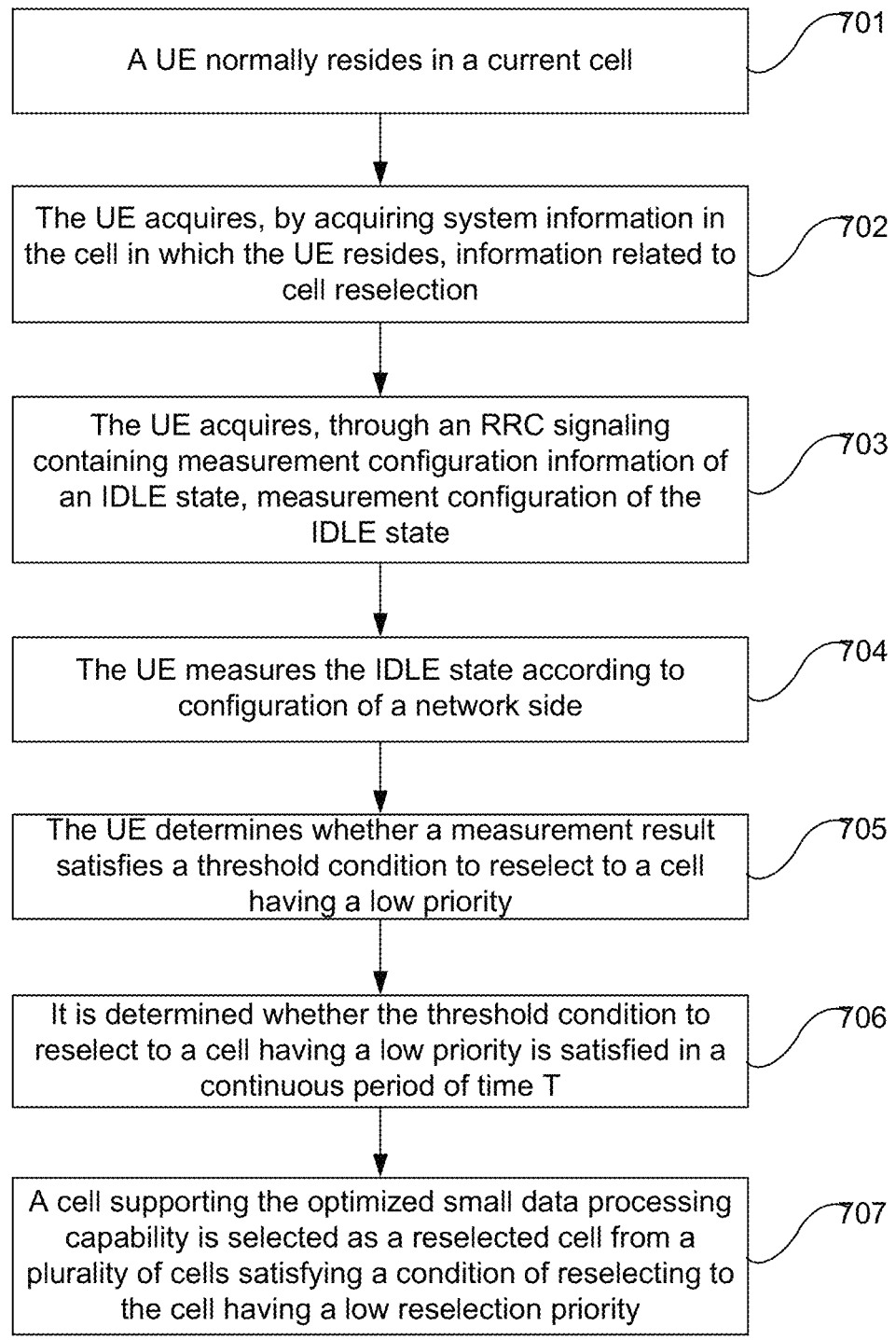
FIG. 7 is a flowchart of preferentially switching a UE from a source cell not supporting an optimized small data processing capability to a target cell supporting the optimized small data processing capability in an embodiment of the disclosure.

FIG. 7 flowchart of selecting, by a UE, a cell supporting an optimized small data processing capability as a reselected cell from a plurality of cells satisfying a condition of reselecting the cells to a low reselection priority, including the following steps:

Step 701: A UE having a small data feature normally resides in a current cell.

The UE normally resides in the current cell after a cell selection or reselection process. The UE may receive a system message and initiate an RRC connection establishment process and so on in the cell in which the UE resides normally. In the present embodiment, the UE is going to send small data and the current cell is cell A.

Step 702: The UE acquires, by acquiring system information in the cell in which the UE resides, information related to cell reselection.

An eNB may transmit parameters related to a cell reselection process to the UE by using a system message or an RRC signaling containing cell reselection information. The eNB may further notify the UE of whether a cell supports an optimized small data processing capability in the message so as to assist the UE to perform a subsequent cell reselection process.

In the present embodiment, the eNB transmits the parameters related to the cell reselection process and supporting information of the optimized small data processing capability to the UE through the system message so that the parameters and the supporting information are used in the subsequent cell reselection process. The related parameters in the cell reselection process include: a cell reselection priority, a cell delay value and a threshold of a co-frequency cell selection receiving grade and so on. The reselection priority of cell A is 3. However, since the cell supports the optimized small data processing capability, it is believed that the cell has the highest reselection priority which is 7. A cell selection quality threshold to reselect to a cell having a low priority is 4 dB, a threshold of the cell selection quality of a service cell is 3 dB, a small data processing capability factor of a low reselection priority is 1 dB which is the same as a small data processing capability factor of the service cell.

Step 703: The UE acquires, through an RRC signaling containing measurement configuration information of an IDLE state, measurement configuration of the IDLE state.

The eNB configures measurement for a UE at the IDLE state through an RRC connection reconfiguration signaling containing the measurement configuration information.

There are two adjacent cells measured by the UE in the present embodiment, cell B and cell C. These two cells are inter-frequency cells.

Step 704: The UE measures the IDLE state according to configuration of a network side.

The UE performs the measurement according to measurement information configured by the eNB, and acquires the reference signal receiving power or reference signal receiving quality of each cell after the measurement. The parameters above are necessary for the UE to perform the cell reselection process.

In the present embodiment, the UE learns, through the measurement and a system message obtained from a measured cell, that cell B supports the optimized small data processing capability while cell C does not support the optimized small data processing capability. At the moment, the cell selection quality of cell B is 4 dB, the cell selection quality of cell C is 5 dB, the cell selection quality of cell A is 1 dB, and the cell reselection priorities of cell B and cell C are 4 and 6 respectively which are lower than that of cell A.

Step 705: The UE determines whether a measurement result satisfies a threshold condition to reselect to a cell having a low priority.

In the present embodiment, since the cell reselection priorities of cell B and cell C are lower than that of cell A, the UE determines, according to an optimized cell reselection criterion, whether the measurement result satisfies a cell reselection condition.

Cell A satisfies that the sum of the cell selection quality (1 dB) and a small data processing capability factor (1 dB) of the service cell is lower than a cell selection quality threshold (3 dB) of the service cell.

Cell B satisfies that the sum of the cell selection quality (4 dB) and a small data processing capability factor (1 dB) of a low reselection priority is lower than a cell selection quality threshold (4 dB) to reselect to a cell having a low priority;

Cell C satisfies that the cell selection quality (5 dB) is higher than a cell selection quality threshold (4 dB) to reselect to a cell having a low priority.

Step 706: Whether the threshold condition to reselect to a cell having a low priority is satisfied in a continuous period of time T is determined.

In the present embodiment, the time T is 2 seconds. In a continuous period of 2 seconds, reselection results acquired by cell B and cell C satisfy the threshold condition to reselect to a cell having a low priority.

Step 707: A cell supporting the optimized small data processing capability is selected as a reselected cell from a plurality of cells satisfying a condition of reselecting the cells to a low reselection priority.

The UE resides in cell A for 3 seconds, which exceeds a reselection threshold to reside in a service cell for at least 1 second. A small data priority reselection principle is applied. The UE preferentially selects the cell supporting the optimized small data processing capability from the plurality of cells satisfying the condition of reselecting the cells to a low reselection priority as a reselected cell. Therefore, the UE decides to reselect to cell C. After residing in cell C, the UE believes that cell C has the lowest priority which is 0 because cell C does not support the optimized small data processing capability.

An embodiment of the disclosure further provides a mobility optimization method, including that:

a network device provides cell reselection information to a UE having a small data feature and normally residing in a cell, wherein the cell reselection information includes a small data processing capability factor and/or capability information indicating whether a network supports optimized small data processing or not;

during execution of switching, a target eNB having an optimized small data processing capability and satisfying a switching condition is selected preferentially for the UE having the small data feature, and a switching request message is sent to the selected target eNB.

Herein the small data processing capability factor includes one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

The cell reselection information is transmitted to the UE through one of the following methods or a combination of several of the following methods: a system message; and a downlink RRC signaling.

In an embodiment, the target eNB having the optimized small data processing capability is selected preferentially through one of the following methods:

when there are a plurality of target eNBs satisfying the switching condition and if the target eNBs include a plurality of eNBs supporting the optimized small data processing capability, an eNB with the best performance and/or the smallest load is selected preferentially as the target eNB;

when there are a plurality of target eNBs satisfying the switching condition and if only one eNB supports the optimized small data processing capability, the eNB supporting the optimized small data processing capability is selected preferentially as the target eNB.

The UE having the small data feature includes at least one of the followings:
- a UE configured to have a small data property;
- a UE only supporting a small data service; and
- a UE in receiving or sending small data.

Corresponding to the mobility optimization method, an embodiment of the disclosure further provides an access network device, including:

an information providing module, configured to provide cell reselection information to a UE normally residing in a cell and having a small data feature, wherein the information of a reselection principle, including a small data processing capability factor and/or capability information indicating whether a network supports optimized small data processing or not;

a cell switching module configured to preferentially select, during execution of switching, a target eNB having an optimized small data processing capability and satisfying a switching condition for the UE having the small data feature and send a switching request message to the selected target eNB.

In an embodiment, the cell switching module is further configured to preferentially select the target eNB having the optimized small data processing capability through one of the following methods:

when there are a plurality of target eNBs satisfying the switching condition and if the target eNBs include a plurality of eNBs supporting the optimized small data processing capability, an eNB with the best performance and/or the smallest load is selected preferentially as the target eNB;

when there are a plurality of target eNBs satisfying the switching condition and if only one eNB supports the optimized small data processing capability, the eNB supporting the optimized small data processing capability is selected preferentially as the target eNB.

The UE having the small data feature includes at least one of the followings:
- a UE configured to have a small data property;
- a UE only supporting a small data service; and
- a UE receiving or sending small data.

The mobility optimization method will be further elaborated in details below in conjunction with specific embodiments.

Figure 8:
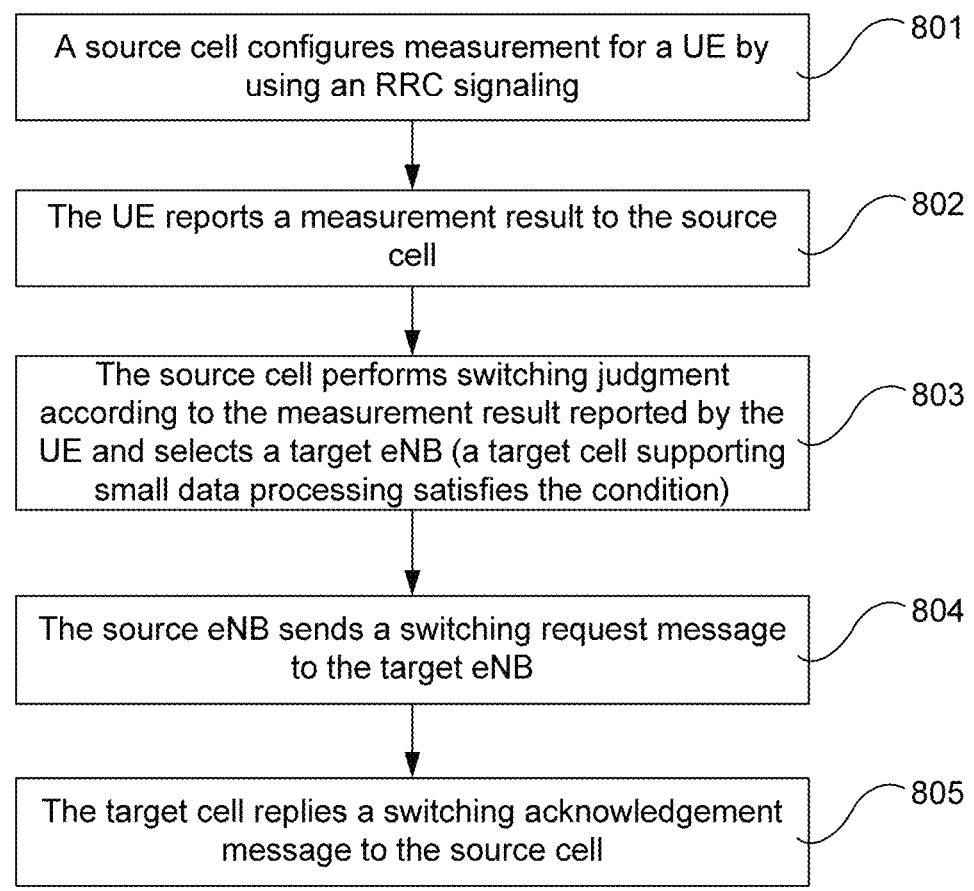
FIG. 8 is a flowchart of selecting, by a UE, a cell supporting an optimized small data processing capability as a reselected cell from a plurality of cells satisfying a condition of reselecting the cells to a low reselection priority in an embodiment of the disclosure.

FIG. 8 is a flow of preferentially switching a UE from a source cell not supporting an optimized small data processing capability to a target cell supporting the optimized small data processing capability in an embodiment of the disclosure, including the following steps:

Step 801: A source cell configures measurement for a UE by using an RRC signaling.

In the present embodiment, the source cell uses an RRC connection reconfiguration message to configure measurement information for the UE.

Step 802: The UE reports a measurement result to the source cell.

The UE reports the measurement result to the source eNB when satisfying a configured measurement reporting condition.

Step 803: The source cell performs switching judgment according to the measurement result reported by the UE and selects a target eNB.

The measurement result reported by the UE satisfies a switching condition, and thus the source eNB decides to execute switching. In the present embodiment, eNB A1 and eNB A2 may be used as the target cells to perform the switching, wherein eNB A1 supports an optimized small data processing capability while eNB A2 does not support the optimized small data processing capability. When a plurality of cells may be used as the target cells, a cell supporting the optimized small data processing capability is selected as the target cell according to an optimized target cell selection solution, thus eNB A1 is selected as the target cell in the present embodiment.

Step 804: The source eNB sends a switching request message to the target eNB.

The source eNB initiates a switching request to the target eNB A1. The message carries information elements including a RRC context and history information and so on of the UE.

Step 805: The target cell replies a switching acknowledgement message to the source cell.

After receiving the switching request of the source eNB, the target eNB A1 determines, according to an access permission control condition, whether the UE is allowed to access. In the present embodiment, the target eNB A1 allows the UE to access, and sends a dedicated random access preamble sequence and information of a safety algorithm of the target eNB A1 and so on to the UE in the message. The target eNB A1 sends an acknowledgement message of the switching request to the source eNB.

Figure 9:
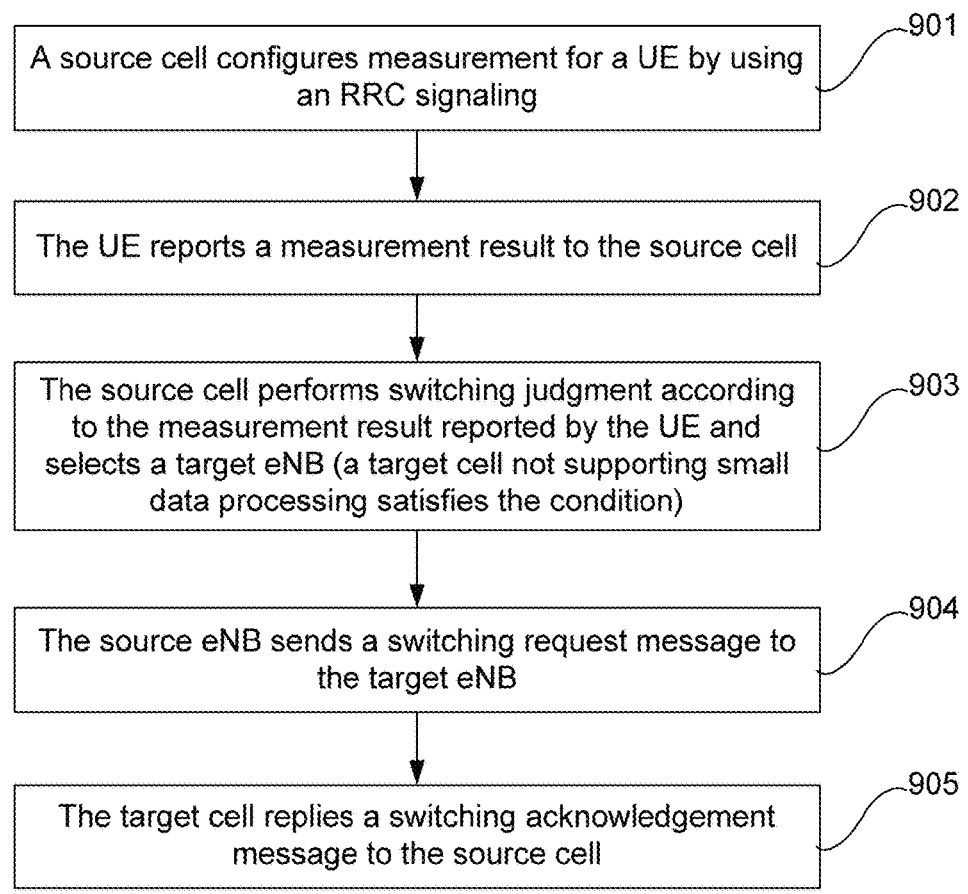
FIG. 9 is a flowchart of preferentially switching a UE from a source cell supporting optimized small data processing to a target cell not supporting an optimized small data processing capability in an embodiment of the disclosure.

FIG. 9 is a flow of preferentially switching a UE from a source cell supporting optimized small data processing to a target cell not supporting an optimized small data processing capability, including the following steps:

Step 901: A source cell configures measurement for a UE by using an RRC signaling.

In the present embodiment, the source cell uses an RRC connection reconfiguration message to configure measurement information for the UE.

Step 902: The UE reports a measurement result to the source cell.

The UE reports the measurement result to the source eNB when satisfying a configured measurement reporting condition.

Step 903: The source cell performs switching judgment according to the measurement result reported by the UE and selects a target eNB.

The measurement result reported by the UE satisfies a switching condition, thus the source eNB decides to execute switching. In the present embodiment, eNB A1 supports an optimized small data processing capability while eNB A2 does not support the optimized small data processing capability, wherein eNB A1 does not satisfy a condition of selecting the target eNB by the source eNB while eNB A2 satisfies the condition of selecting the target eNB by the source eNB and eNB A2 is selected as the target cell in the present embodiment according to an optimized target cell selection solution.

Step 904: The source eNB sends a switching request message to the target eNB.

The source eNB initiates a switching request to the target eNB A2. The message carries information elements including a RRC context and history information and so on of the UE.

Step 905: The target cell replies a switching acknowledgement message to the source cell.

After receiving the switching request of the source eNB, the target eNB A2 determines, according to an access permission control condition, whether the UE is allowed to access. In the present embodiment, the target eNB A2 allows the UE to access, and sends a dedicated random access preamble sequence and information of a safety algorithm of the target eNB A2 and so on to the UE in the message. The target eNB A2 sends an acknowledgement message of the switching request to the source eNB.

The above are only preferred embodiments of the disclosure, but are used for limiting the protection scope of the disclosure.

What is claimed is:

1. A mobility optimization method, the method comprising:

performing, by a User Equipment (UE) having a small data feature, cell reselection according to information of a small data priority cell reselection principle, by which a cell supporting small data tends to be selected, when determining that a cell supporting an optimized small data processing capability exists in candidate cells during execution of the cell reselection, wherein a network supporting an optimized small data transmission is preferentially reselected by the UE having the small data feature;

wherein the information of the small data priority cell reselection principle comprises one of the followings or a combination of several of the followings:

in the case that a plurality of cells supporting the optimized small data processing capability satisfy a reselection condition, a cell having the highest reselection priority and/or the highest cell ranking is selected from the cells supporting the optimized small data processing capability;

the UE having the small data feature only selects a cell having the highest reselection priority or the highest cell ranking from cells supporting the optimized small data processing capability;

when the UE having the small data feature normally resides in a current cell supporting the optimized small data processing capability, reselection to a cell not supporting the optimized small data processing capability is delayed; and when the UE having the small data feature normally resides in a current cell not supporting the optimized small data processing capability, reselection to a cell supporting the optimized small data processing capability is accelerated.

2. The mobility optimization method according to claim 1, wherein the UE having the small data feature comprises one of the followings:

a UE configured to have a small data property;
a UE only supporting a small data service;
a UE going to receive or send small data; and
a UE in receiving or sending small data.

3. The mobility optimization method according to claim 1, wherein the information of the small data priority cell reselection principle further comprises:

when the UE having the small data feature normally resides in a current cell supporting the optimized small data processing capability, the current cell has the highest reselection priority.

4. The mobility optimization method according to claim 1, wherein the operation that the reselection to the cell not supporting the optimized small data processing capability is delayed comprises one of the followings or a combination of several of the followings:

in the case that, during a first preset continuous period of time, the sum of a cell selection receiving grade of a service cell and a small data processing capability factor is lower than a threshold of the cell selection receiving grade of the service cell, and a cell selection receiving grade of a cell having a low reselection priority is higher than a cell selection receiving grade threshold to reselect to a cell having a low priority, while the UE having the small data feature resides in a current cell for a duration exceeding a second preset period time, reselecting to a cell not supporting optimized small data processing and having a low reselection priority;

in the case that, during a first preset continuous period of time, the sum of cell selection quality of a service cell and a small data processing capability factor is lower than a threshold of the cell selection quality of the service cell and cell selection quality of a cell having a low reselection priority is higher than a cell selection quality threshold to reselect to a cell having a low priority while the UE having the small data feature resides in a current cell for a duration exceeding a second preset period of time, reselecting to a cell not supporting optimized small data processing and having a low reselection priority;

in the case that, during a first preset continuous period of time, a cell selection receiving grade of a cell having a high reselection priority is higher than a cell selection receiving grade threshold to reselect to a cell having a high priority, while the UE having the small data feature resides in a current cell for a duration exceeding a second preset period of time, reselecting to a cell not supporting optimized small data processing and having a high reselection priority;

in the case that, during a first preset continuous period of time, cell selection quality of a cell having a high reselection priority is higher than a cell selection quality threshold to reselect to a cell having a high priority while the UE having the small data feature resides in a current cell for a duration exceeding a second preset period of time, reselecting to a cell not supporting optimized small data processing and having a high reselection priority;

in the case that, during a first preset continuous period of time, a cell ranking of a cell having a different central frequency from that of a service cell, but having the same reselection priority as that of the service cell, is higher than the sum of a ranking of the service cell and a small data processing capability factor while the UE having the small data feature resides in a current cell for a duration exceeding a second preset period of time, reselecting to a cell having a different central frequency, but having the same reselection priority and not supporting the optimized small data processing capability; and in the case that, during a first preset continuous period of time, a cell ranking of a cell having the same central frequency as that of a service cell is higher than the sum of a ranking of the service cell and a small data processing capability factor while the UE having the small data feature resides in a current cell for a duration exceeding a second preset period of time, reselecting to a cell having the same central frequency, but not supporting the optimized small data processing capability; and wherein the small data processing capability factor comprises one of the followings or a combination of several of the followings:

a small data processing capability factor of a low reselection priority;
a small data processing capability factor of a high reselection priority;
a small data processing capability factor of a different frequency and the same reselection priority;

a small data processing capability factor of the same frequency; and a small data processing capability factor of a service cell.

5. The mobility optimization method according to claim 1, wherein the operation that the reselection to the cell supporting the optimized small data processing capability is accelerated comprises one of the followings or a combination of several of the followings:

in the case that, during a first preset continuous period of time, a cell selection receiving grade of a service cell is lower than a threshold of the cell selection receiving grade of the service cell and the sum of a cell selection receiving grade of a cell having a low reselection priority and a small data processing capability factor is higher than a cell selection receiving grade threshold to reselect to a cell having a low priority while the UE having the small data feature resides in a current cell for a duration exceeding a second preset period of time, reselecting to a cell supporting the optimized small data processing capability and having a low reselection priority;

in the case that, during a first preset continuous period of time, cell selection quality of a service cell is lower than a threshold of the cell selection quality of the service cell, and the sum of cell selection quality of a cell having a low reselection priority and a small data processing capability factor is higher than a cell selection quality threshold to reselect to a cell having a low priority while the UE having the small data feature resides in a current cell for a duration exceeding a second preset period of time, reselecting to a cell supporting the optimized small data processing capability and having a low reselection priority;

in the case that, during a first preset continuous period of time, the sum of a cell selection receiving grade of a cell having a high reselection priority and a small data processing capability factor is higher than a cell selection receiving grade threshold to reselect to a cell having a high priority while the UE having the small data feature resides in a current cell for a duration exceeding a second preset period of time, reselecting to a cell supporting the optimized small data processing capability and having a high reselection priority;

in the case that, during a first preset continuous period of time, the sum of cell selection quality of a cell having a high reselection priority and a small data processing capability factor is higher than a cell selection quality threshold to reselect to a cell having a high priority while the UE having a small data feature resides in a current cell for a duration exceeding a second preset period of time, reselecting to a cell supporting the optimized small data processing capability and having a high reselection priority;

in the case that, during a first preset continuous period of time, the sum of a cell ranking of a cell having a different central frequency from that of a service cell but having the same reselection priority as that of the service cell and a small data processing capability factor is higher than a ranking of the service cell while the UE having the small data feature resides in a current cell for a duration exceeding a second preset period of time, reselecting to a cell having a different central frequency but having the same reselection priority and supporting the optimized small data processing capability; and in the case that, during a first preset continuous period of time, the sum of a cell ranking of a cell having the same central frequency as that of a service cell and a small data processing capability factor is higher than a ranking of the service cell while the UE having the small data feature resides in a current cell for a duration exceeding a second preset period of time, reselecting to a cell having the same central frequency and supporting the optimized small data processing capability; and wherein the small data processing capability factor comprises one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

6. A mobility optimization method, the method comprising:

providing, by a network device, cell reselection information to a User Equipment (UE) having a small data feature and normally residing in a cell, wherein the cell reselection information comprises a small data processing capability factor and/or capability information indicating whether a network supports optimized small data processing or not; and during execution of switching, preferentially selecting a target Evolved Node B (eNB) having an optimized small data processing capability and satisfying a switching condition for the UE having the small data feature, and sending a switching request message to the selected target eNB, wherein a network supporting an optimized small data transmission is preferentially selected by the UE having the small data feature;

wherein the target eNB having the optimized small data processing capability is selected preferentially through one of the following methods:

when there are a plurality of eNBs satisfying the switching condition and supporting the optimized small data processing capability, preferentially selecting an eNB with the best performance and/or the smallest load as the target eNB; and when there are a plurality of eNBs satisfying the switching condition and only one eNB supports the optimized small data processing capability, preferentially selecting the eNB supporting the optimized small data processing capability as the target eNB.

7. The mobility optimization method according to claim 6, wherein the small data processing capability factor comprises one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

8. The mobility optimization method according to claim 6, wherein the cell reselection information is transmitted to the UE through a system message and/or a downlink Radio Resource Control (RRC) signaling.

9. The mobility optimization method according to claim 6, wherein the UE having the small data feature comprises at least one of the followings:
- a UE configured to have a small data property;
- a UE only supporting a small data service; and
- a UE in receiving or sending small data.

10. The UE according to claim 9, wherein the operation that the reselection to the cell not supporting the optimized small data processing capability is delayed comprises one of the followings or a combination of several of the followings:
- in the case that, during a first preset continuous period of time, the sum of a cell selection receiving grade of a service cell and a small data processing capability factor is lower than a threshold of the cell selection receiving grade of the service cell, and a cell selection receiving grade of a cell having a low reselection priority is higher than a cell selection receiving grade threshold to reselect to a cell having a low priority, while the UE having the small data feature resides in a current cell for a duration exceeding a second preset period time, reselecting to a cell not supporting optimized small data processing and having a low reselection priority;
- in the case that, during a first preset continuous period of time, the sum of cell selection quality of a service cell and a small data processing capability factor is lower than a threshold of the cell selection quality of the service cell and cell selection quality of a cell having a low reselection priority is higher than a cell selection quality threshold to reselect to a cell having a low priority while the UE having the small data feature resides in a current cell for a duration exceeding a second preset period of time, reselecting to a cell not supporting optimized small data processing and having a low reselection priority;
- in the case that, during a first preset continuous period of time, a cell selection receiving grade of a cell having a high reselection priority is higher than a cell selection receiving grade threshold to reselect to a cell having a high priority, while the UE having the small data feature resides in a current cell for a duration exceeding a second preset period of time, reselecting to a cell not supporting optimized small data processing and having a high reselection priority;
- in the case that, during a first preset continuous period of time, cell selection quality of a cell having a high reselection priority is higher than a cell selection quality threshold to reselect to a cell having a high priority while the UE having the small data feature resides in a current cell for a duration exceeding a second preset period of time, reselecting to a cell not supporting optimized small data processing and having a high reselection priority;
- in the case that, during a first preset continuous period of time, a cell ranking of a cell having a different central frequency from that of a service cell, but having the same reselection priority as that of the service cell, is higher than the sum of a ranking of the service cell and a small data processing capability factor while the UE having the small data feature resides in a current cell for a duration exceeding a second preset period of time, reselecting to a cell having a different central frequency, but having the same reselection priority and not supporting the optimized small data processing capability; and
- in the case that, during a first preset continuous period of time, a cell ranking of a cell having the same central frequency as that of a service cell is higher than the sum of a ranking of the service cell and a small data processing capability factor while the UE having the small data feature resides in a current cell for a duration exceeding a second preset period of time, reselecting to a cell having the same central frequency, but not supporting the optimized small data processing capability; and wherein the small data processing capability factor comprises one of the followings or a combination of several of the followings:
- a small data processing capability factor of a low reselection priority;
- a small data processing capability factor of a high reselection priority;
- a small data processing capability factor of a different frequency and the same reselection priority;
- a small data processing capability factor of the same frequency; and
- a small data processing capability factor of a service cell.

11. The UE according to claim 9, wherein the operation that the reselection to the cell supporting the optimized small data processing capability is accelerated comprises one of the followings or a combination of several of the followings:
- in the case that, during a first preset continuous period of time, a cell selection receiving grade of a service cell is lower than a threshold of the cell selection receiving grade of the service cell and the sum of a cell selection receiving grade of a cell having a low reselection priority and a small data processing capability factor is higher than a cell selection receiving grade threshold to reselect to a cell having a low priority while the UE having the small data feature resides in a current cell for a duration exceeding a second preset period of time, reselecting to a cell supporting the optimized small data processing capability and having a low reselection priority;
- in the case that, during a first preset continuous period of time, cell selection quality of a service cell is lower than a threshold of the cell selection quality of the service cell, and the sum of cell selection quality of a cell having a low reselection priority and a small data processing capability factor is higher than a cell selection quality threshold to reselect to a cell having a low priority while the UE having the small data feature resides in a current cell for a duration exceeding a second preset period of time, reselecting to a cell supporting the optimized small data processing capability and having a low reselection priority;
- in the case that, during a first preset continuous period of time, the sum of a cell selection receiving grade of a cell having a high reselection priority and a small data processing capability factor is higher than a cell selection receiving grade threshold to reselect to a cell having a high priority while the UE having the small data feature resides in a current cell for a duration exceeding a second preset period of time, reselecting to a cell supporting the optimized small data processing capability and having a high reselection priority;
- in the case that, during a first preset continuous period of time, the sum of cell selection quality of a cell having a high reselection priority and a small data processing capability factor is higher than a cell selection quality threshold to reselect to a cell having a high priority while the UE having a small data feature resides in a current cell for a duration exceeding a second preset period of time, reselecting to a cell supporting the optimized small data processing capability and having a high reselection priority;

in the case that, during a first preset continuous period of time, the sum of a cell ranking of a cell having a different central frequency from that of a service cell but having the same reselection priority as that of the service cell and a small data processing capability factor is higher than a ranking of the service cell while the UE having the small data feature resides in a current cell for a duration exceeding a second preset period of time, reselecting to a cell having a different central frequency but having the same reselection priority and supporting the optimized small data processing capability; and in the case that, during a first preset continuous period of time, the sum of a cell ranking of a cell having the same central frequency as that of a service cell and a small data processing capability factor is higher than a ranking of the service cell while the UE having the small data feature resides in a current cell for a duration exceeding a second preset period of time, reselecting to a cell having the same central frequency and supporting the optimized small data processing capability; and wherein the small data processing capability factor comprises one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

12. A User Equipment (UE), the UE having a small data feature and comprising:

a determination module, configured to determine, during a process in which the UE executes cell reselection, whether a cell supporting an optimized small data processing capability exists in candidate cells;

a cell reselection module, configured to perform, when it is determined according to determination of the determination module that the cell supporting the optimized small data processing capability exists in the candidate cells, the cell reselection according to information of a small data priority cell reselection principle by which a cell supporting small data tends to be selected, wherein a network supporting an optimized small data transmission is preferentially reselected by the UE having the small data feature;

wherein the information of the small data priority cell reselection principle comprises one of the followings or a combination of several of the followings:

in the case that a plurality of cells supporting the optimized small data processing capability satisfy a reselection, a cell having the highest reselection priority and/or the highest cell ranking is selected from the cells supporting the optimized small data processing capability;

the UE having the small data feature only selects a cell having the highest reselection priority or the highest cell ranking from cells supporting the optimized small data processing capability;

when the UE having the small data feature normally resides in a current cell supporting the optimized small data processing capability, reselection to a cell not supporting the optimized small data processing capability is delayed; and when the UE having the small data feature normally resides in a current cell not supporting the optimized small data processing capability, reselection to a cell supporting the optimized small data processing capability is accelerated.

13. The UE according to claim 12, wherein the UE having the small data feature comprises at least one of the followings:

a UE configured to have a small data property;

a UE only supporting a small data service;

a UE going to receive or send small data; and a UE in receiving or sending small data.

14. The UE according to claim 12, wherein the information of the small data priority cell reselection principle further comprises:

when the UE having the small data feature normally resides in a current cell supporting the optimized small data processing capability, the current cell has the highest reselection priority.

15. An access network device, comprising:

an information providing module, configured to provide cell reselection information to a User Equipment (UE) normally residing in a cell and having a small data feature, wherein the cell reselection information comprises information of a reselection principle including a small data processing capability factor and/or capability information indicating whether a network supports optimized small data processing or not; and a cell switching module configured to preferentially select, during execution of switching, a target Evolved Node B (eNB) having an optimized small data processing capability and satisfying a switching condition for the UE having the small data feature and send a switching request message to the selected target eNB, wherein a network supporting an optimized small data transmission is preferentially selected by the UE having the small data feature;

wherein the cell switching module is further configured to preferentially select the target eNB having the optimized small data processing capability through one of the following methods:

when there are a plurality of eNBs satisfying the switching condition and supporting the optimized small data processing capability, preferentially selecting an eNB with the best performance and/or the smallest load as the target eNB; and when there are a plurality of eNBs satisfying the switching condition and only one eNB supports the optimized small data processing capability, preferentially selecting the eNB supporting the optimized small data processing capability as the target eNB.

16. The access network device according to claim 15, wherein the small data processing capability factor comprises one of the followings or a combination of several of the followings:

a small data processing capability factor of a low reselection priority;

a small data processing capability factor of a high reselection priority;

a small data processing capability factor of a different frequency and the same reselection priority;

a small data processing capability factor of the same frequency; and a small data processing capability factor of a service cell.

17. The access network device according to claim 15, wherein the cell reselection information is transmitted to the UE through a system message and/or a downlink Radio Resource Control (RRC) signaling.

18. The access network device according to claim 15, wherein the UE having the small data feature comprises at least one of the followings:
- a UE configured to have a small data property;
- a UE only supporting a small data service; and
- a UE in receiving or sending small data.

* * * * *